US008407778B2

(12) United States Patent
Moonen (10) Patent No.: US 8,407,778 B2
(45) Date of Patent: Mar. 26, 2013

(54) APPARATUS AND METHODS FOR PROCESSING FILTER RULES (75) Inventor: Scott Christopher Moonen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1893 days.

(21) Appl. No.: 11/161,654

(22) Filed: Aug. 11, 2005

(65) Prior Publication Data

US 2007/0039044 A1 Feb. 15, 2007

(51) Int. Cl.
*G06F 9/00* (2006.01)
*G06F 15/16* (2006.01)
*G06F 17/00* (2006.01)

(52) U.S. Cl. .............. 726/13; 726/11; 726/12; 726/16; 726/1; 709/223; 709/224; 709/225; 709/226; 709/227; 713/160; 370/229; 370/230; 370/235; 370/394; 370/395.31

(58) Field of Classification Search .............. 726/13
See application file for complete search history.

(56) References Cited

U.S. PATENT DOCUMENTS

| 5,951,651 | A | 9/1999 | Lakshman et al. |
| 6,289,013 | B1 | 9/2001 | Lakshman et al. |
| 6,330,562 | B1 * | 12/2001 | Boden et al. ............ 707/10 |
| 6,347,376 | B1 | 2/2002 | Attwood et al. |
| 6,587,466 | B1 * | 7/2003 | Bhattacharya et al. .. 370/395.21 |
| 6,654,372 | B1 | 11/2003 | Arts et al. |
| 6,662,235 | B1 | 12/2003 | Callis et al. |
| 6,986,061 | B1 * | 1/2006 | Kunzinger ............... 713/153 |
| 2002/0194317 | A1 * | 12/2002 | Kanada et al. ............ 709/223 |
| 2003/0051165 | A1 | 3/2003 | Krishnan et al. |
| 2003/0212900 | A1 * | 11/2003 | Liu et al. ................ 713/200 |
| 2004/0004956 | A1 | 1/2004 | Gilmour et al. |
| 2005/0076138 | A1 | 4/2005 | Sterne |

OTHER PUBLICATIONS

IBM z/OS V1.6: Integrating New Applications and Preview: z/OS V1.7, Aug. 10, 2004.

* cited by examiner

*Primary Examiner* — Nathan Flynn
*Assistant Examiner* — Bryan Wright
(74) *Attorney, Agent, or Firm* — Steven M. Greenberg, Esq.; Carey, Rodriguez, Greenberg & O'Keefe (57) ABSTRACT

Techniques for processing filter rules are disclosed. To this end, filter rules having one or more attributes where each attribute indicates a condition to qualify whether a filter rule applies to a subsequent event are received. Summary rules are generated where each summary rule has a number of summary conditions. Some filter rules become associated with the generated summary rules. The summary conditions are extended to span the attributes of the associated filter rules.

18 Claims, 5 Drawing Sheets

APPARATUS AND METHODS FOR PROCESSING FILTER RULES

The present invention generally relates to improved apparatus and methods for processing filter rules, and more particularly, to advantageous systems, methods, and computer readable medium for assembling Internet protocol (IP) policy rules to reduce conditional testing when processing an incoming packet.

BACKGROUND OF THE INVENTION

RFC 2401—"Security Architecture for the Internet Protocol" sets forth an architecture for the implementation of security in networks that use the Internet protocol. This security architecture is commonly referred to as Ipsec. IPsec is the architecture endorsed by the Internet Engineering Task Force (IETF) for applying encryption and authentication security services to datagrams, or packets, at the IP layer of the protocol stack. The IPsec specification requires a Security Policy Database (SPD) that is used to determine how each incoming and outgoing packet is to be handled from a security perspective. The basic choices are deny packet, permit packet, and permit packet with IPsec processing. If IPsec processing is to be applied to a packet, the database specifies the precise processing that is to be applied. Because IPsec is applied at the IP layer, it is used for all upper layer protocols such as transmission control protocol (TCP), user datagram protocol (UDP), internet control message protocol (ICMP), and the like, and it is applied as a connectionless protocol. In other words, each IP packet is processed independently of any other packet.

In the known art, the SPD contains static rules and placeholders for dynamic rules. The rules and placeholders contain attributes to be matched against the corresponding attributes of incoming and outgoing packets to determine which rule should be applied to a packet. The attributes contained in the rules and placeholders might be different combinations of Internet protocol (IP) source address, source port, IP destination address, destination port, and the protocol to be used. The attributes contained within a specific rule or placeholder can be as granular as specific hosts, ports and protocol for a match to occur, or as coarse as wild carded host pairs.

A static rule is essentially a policy rule and, like most rules, contains one or more conditions and one or more actions. The conditions determine whether a packet should be governed by the rule and, if it is, the actions that are to be performed. A static rule is predefined for a network and generally is not changed very often. For example, static rules might specify that all traffic between hosts A and B will be permitted without IPsec processing and that all traffic between hosts A and C will be encrypted by IPsec. A dynamic rule is negotiated as needed and linked into the SPD database. The how, when and why of dynamic rule negotiation is not part of the present invention and is not discussed here in detail. It suffices to say that when a dynamic rule is negotiated, the placeholder that contains the most specific attributes that includes the negotiated attributes is used to link the negotiated rule into the SPD database at the appropriate point. In the known art, the static rules, dynamic rules and placeholders are searched for every incoming and outgoing packet at a node to determine how to process the packet.

The IPsec architecture also requires that the rules be defined and processed in a specific order. This requirement comes about because it is important for different hosts to apply the same type of security processing to the same packet. If a packet is encrypted with a specific algorithm, it is important that the receiving node locate the correct rule to decrypt the packet with the corresponding decryption algorithm. RFC 2401 requires that the SPD be ordered and that the SPD always be searched in the same order to insure consistent results at different nodes. The traditional technique of ordering the rules and placeholders in the SPD is from the most specific to least specific in terms of the specification of the attributes in the rules that are used for matching. Thus, the database including static, dynamic rules and placeholders is searched linearly in this order for every incoming and outgoing packet until a first match is found between the attributes of a packet and the attributes stored in a rule. At that point, the matching rule specifies whether the packet is denied, permitted without IPsec processing or permitted with IPsec processing. If the packet is permitted with IPsec processing, the database specifies the details of that processing. This processing could be authentication or encryption or both.

In systems that become aggregation points such as firewalls and servers, the number of filter rules in the database can be hundreds to thousands, depending on the network. In the known art, the SPD database is searched sequentially until a matching rule is found for all incoming and outgoing packets. This sequential search includes static rules and dynamic rules as they are encountered in the database. The performance cost on systems as a result of this searching is significant. In a system that has a mixture of IPsec and non-IPsec traffic, even the non-IPsec traffic is penalized because the filter rules must be searched to determine if a particular packet is subject to IPsec processing or not. Other typical approaches may require additional specialized hardware not typically found standard on a computer, specialized software to run on the computer running the activity monitoring software, or both.

Attwood et al. U.S. Pat. No. 6,347,376 ('376 patent) addresses methods and apparatus for searching the SPD database which involves arranging the database into a set of stable static rules and one or more sets of dynamic security rules wherein a static rule can be a placeholder for a set of dynamic rules. Rules are grouped into five groups. Each group has a different number of attributes specified. Furthermore, each group is organized in its own search tree. When an incoming packet is received, each group is searched for a match on attributes.

Callis et al. U.S. Pat. No. 6,662,235 ('235 patent) addresses methods and systems for processing a complex policy rule structured in a plurality of levels. Based on a per attribute basis, the '235 patent assigns each condition associated with an attribute to the same level. Consequently, the '235 patent assembles rules that compose a specific complex policy rule to different levels, requiring searches at different levels to fully test a complex policy rule.

SUMMARY OF THE INVENTION

The present invention recognizes the need to speed up the search of static rules in an SPD. The present invention advantageously assembles static policy filter rules into sub-list summary rules to minimize the number of comparisons for finding a static policy filter rule which matches an attribute of an incoming or outgoing event. When the attributes of an event do not compare with the conditions of the sub-list summary rule, the present invention avoids further comparison with filter rules associated with the sub-list summary rule, reducing the number of comparisons to find a relevant static policy rule.

Among its several aspects, the present invention provides a method, an apparatus, and computer readable medium for processing filter rules. To this end, the method, for example, includes the step of receiving a plurality of filter rules having one or more attributes where each attribute has a value indicating a condition to qualify whether a filter rule applies to an event. The method also includes the step of generating summary rules where each summary rule has a number of summary conditions. The method associates a portion of the received filter rules to a summary rule. The method also extends the summary conditions of the summary rule to span the attributes of the portion of the received filter rules. One advantageous aspect of assembling summary rules in this way allows for subsequent events to which a filter rule may apply to have their attributes compared against the summary conditions in a summary rule to determine if the associated filter rules need to be compared. If an event does not meet the conditions of a summary rule, the event can then be compared against the next summary rule without having to compare its attributes with the associated filter rules.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as apparatus, methods, or computer program code. Accordingly, the present invention may take the form of an embodiment combining hardware and software aspects. Furthermore, the present invention may take the form of a computer program code on a computer-usable storage medium having computer-usable program code embodied in the medium, wherein the medium is not a transient signal. Any suitable computer readable medium may be utilized including hard disks, CD-ROMs, optical storage devices, flash memories, magnetic storage devices, and the like.

Computer program code or "code" for carrying out operations according to the teachings of the present invention may be written in various programming languages such as assembly, C, C++, Java, or other languages. Software embodiments of the present invention do not depend on implementation with a particular programming language. The program code may execute entirely on a user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer, for example, through the Internet using an Internet Service Provider.

Figure 1:
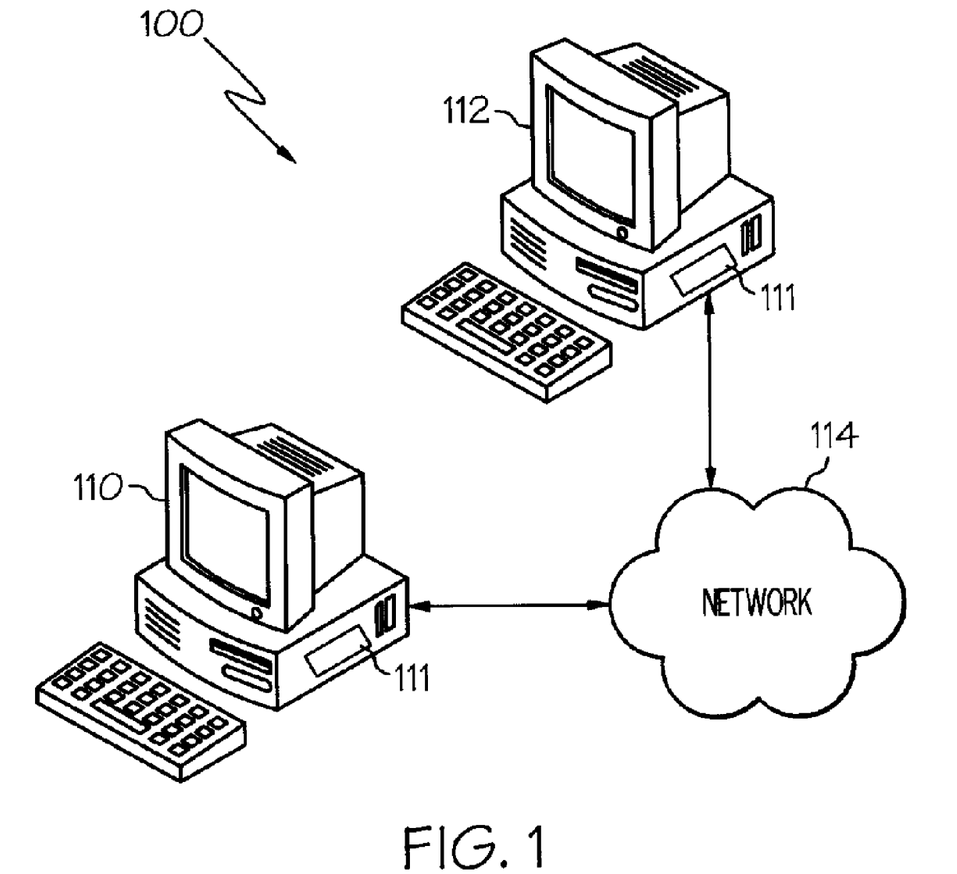
FIG. 1 shows an illustrative network environment employing packet filter processing in accordance with the present invention.

FIG. 1 shows an illustrative network environment 100 employing filter processing in accordance with the present invention. Network environment 100 includes a network 114 interconnecting two nodes 110 and 112. In this example, node 110 is identified as a sending node meaning that it is sending a packet. Node 112 is identified as receiving the packet. Node 110 has computer program code 111 which determines in this instance according to filter rules what action to apply to an outgoing packet from node 110 such as denying the packet, permitting transmission of the packet without IPsec processing or permitting transmission of the packet with IPsec processing. Similarly, node 112 contains computer program code 111 that determines according to filter rules what action to apply to an incoming packet to node 112 such as discarding the incoming packet, accepting the incoming packet without IPsec processing or accepting the incoming packet with IPsec processing. As part of applying filter rules to incoming and outgoing packets, computer program code 111 advantageously assembles filter rules and searches the assembled filter rules in accordance with the teachings of the invention. Further details of computer program code 111 will be discussed in connection with the discussion of FIG. 2 below.

It should be noted that although the nodes 110 and 112 are depicted as a general purpose computers, the present invention applies to any computer system including a laptop, server, a workstation, a desktop, and the like which run computer program code 111 in accordance with the present invention.

Figure 2:
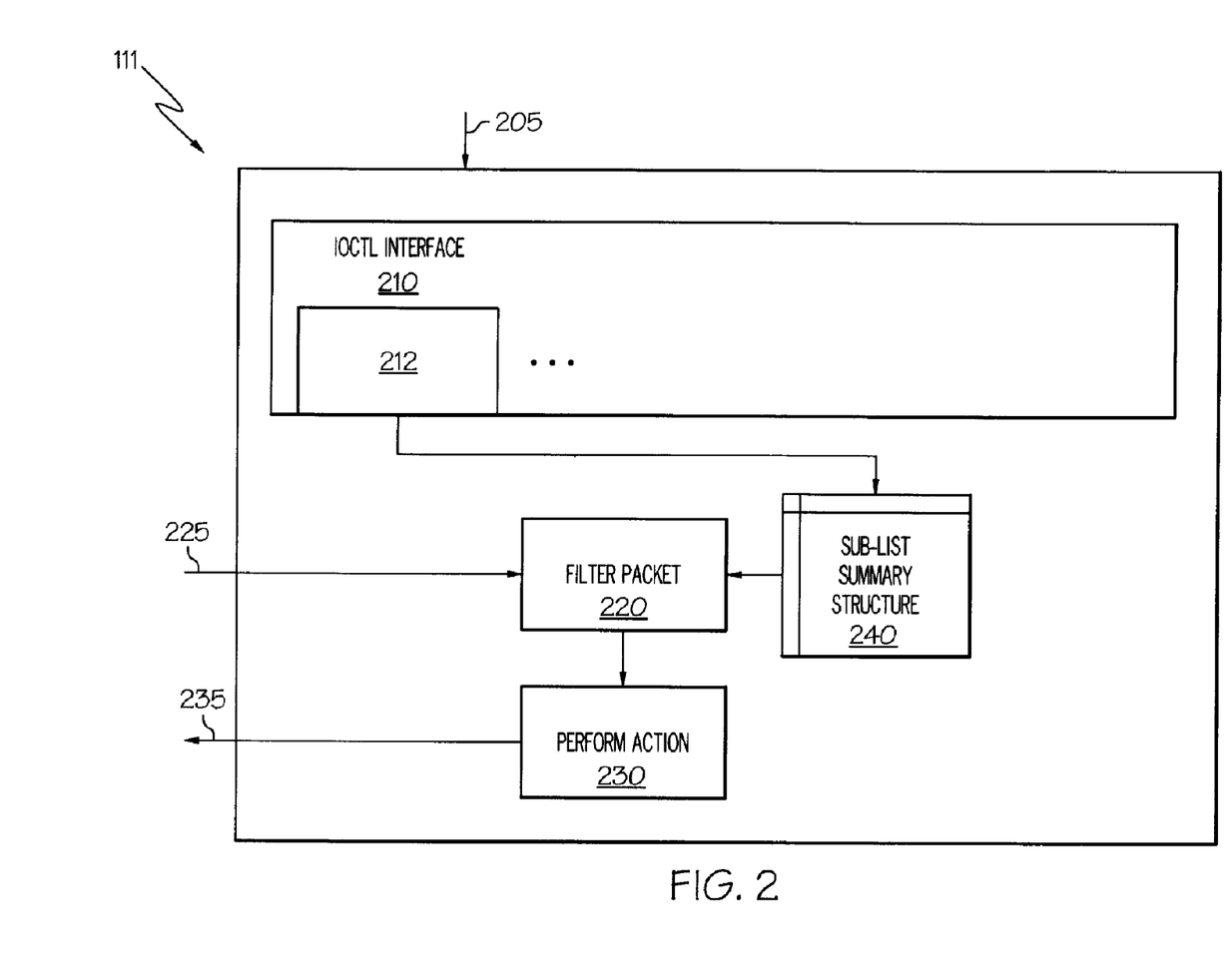
FIG. 2 shows a block diagram of computer program code in accordance with the present invention.

FIG. 2 shows a block diagram of computer program code 111 in accordance with the present invention. Computer program code 111 includes an input/output control interface (IOCTL) module 210, a filter packet module 220, a perform action module 230, and a sub-list summary structure 240. The IOCTL module 210 includes a number of modules including an install filter module 212. Inputs to computer program code 111 include input 205 from a policy agent and input 225 from the transport and IP layers of a TCP/IP stack.

Input 205 includes a list of static policy rules that have been configured for the particular system or network. Although not part of the present invention, a policy manager such as IBM's z/OS Network Security Configuration Assistant may be utilized by a network operator to configure filter rules which are also known as static security policies. The policy manager collects configured filter rules, orders the configured filter rules from most specific rule to least specific rule, and outputs a file with an ordered set of configured filter rules. A policy agent such as IBM's PAgent which is part of IBM's z/OS Communication Server Product reads the file produced by the policy manager.

The policy agent also provides the filter rules in simple form rather than complex form to input 205. For example, a filter rule containing the logical expression (A AND B) OR (C AND D) OR (E AND F) would be simplified to three separate rules (A AND B), (C AND D), and (E AND F). Each simple form rule may contain a common attribute such as a user configured name, a unique identifier, or a filter group name which is used to correlate simple form rules which belong to the same complex form rule. As described further in the discussion in connection with FIG. 4, the install filter module 212 essentially recombines the simple rules into a complex rule by correlating a common attribute associated with the simple rules when assembling a sub-list summary structure 240.

The install filter module 212 advantageously assembles the sub-list summary structure 240 during initialization. The install filter module 212 modifies the sub-list summary structure 240 whenever input 205 indicates that a filter rule has been added, deleted, or modified. An exemplary sub-list summary structure 240 will be discussed further in connection with the discussion of FIG. 3. The sub-list summary structure 240 is an exemplary implementation of a security policy database (SPD). Details of how the sub-list summary structure is assembled will be discussed further below in connection with the discussion of FIG. 4. The sub-list summary structure 240 contains a list of summary structures where each summary structure is associated with one or more filter rules. A summary structure contains a number of attributes and the associated filter rules also contain a number of attributes. The value of each attribute in the summary structure includes a union of values for the corresponding attribute in each of the associated filters. An attribute, in general, is a field which contains a range of values or a choice of selected values. Furthermore, the values associated with an attribute may contain one or more wildcards.

For example, a network operator may specify a number of rules associated with packets originating from particular IP addresses 127.0.10.1, 127.0.10.5, 127.0.10.6, and 127.0.10.10. A corresponding source IP address attribute in the sub-list summary structure would summarize the values for the number of rules configured by the network operator by assigning a range which includes each of these particular IP addresses. The source IP address attribute would then contain a range of IP addresses from 127.0.10.1-127.0.10.10. By summarizing rules in an attribute of a sub-list summary structure, an incoming packet may have its attributes compared against the summary attributes to determine if they fall within the ranges or selected values. If the packets attributes do not fall within the ranges, then a comparison of all the filter rules associated with this particular sub-list summary structure is avoided saving time and processing power. It should be noted that the term "incoming packet" as in the subsequent discussion is relative to computer program code 111 and is not restricted to packets arriving at a particular node.

The filter packet module 220 receives packets from the transport or IP layers of a communication protocol stack such as TCP/IP. The filter packet module 220 utilizes the assembled sub-list summary structure 240 to find rules which apply to an incoming packet. Details of how the filter packet module 220 searches the sub-list summary structure are discussed further in connection with the discussion of FIG. 5.

Figure 3:
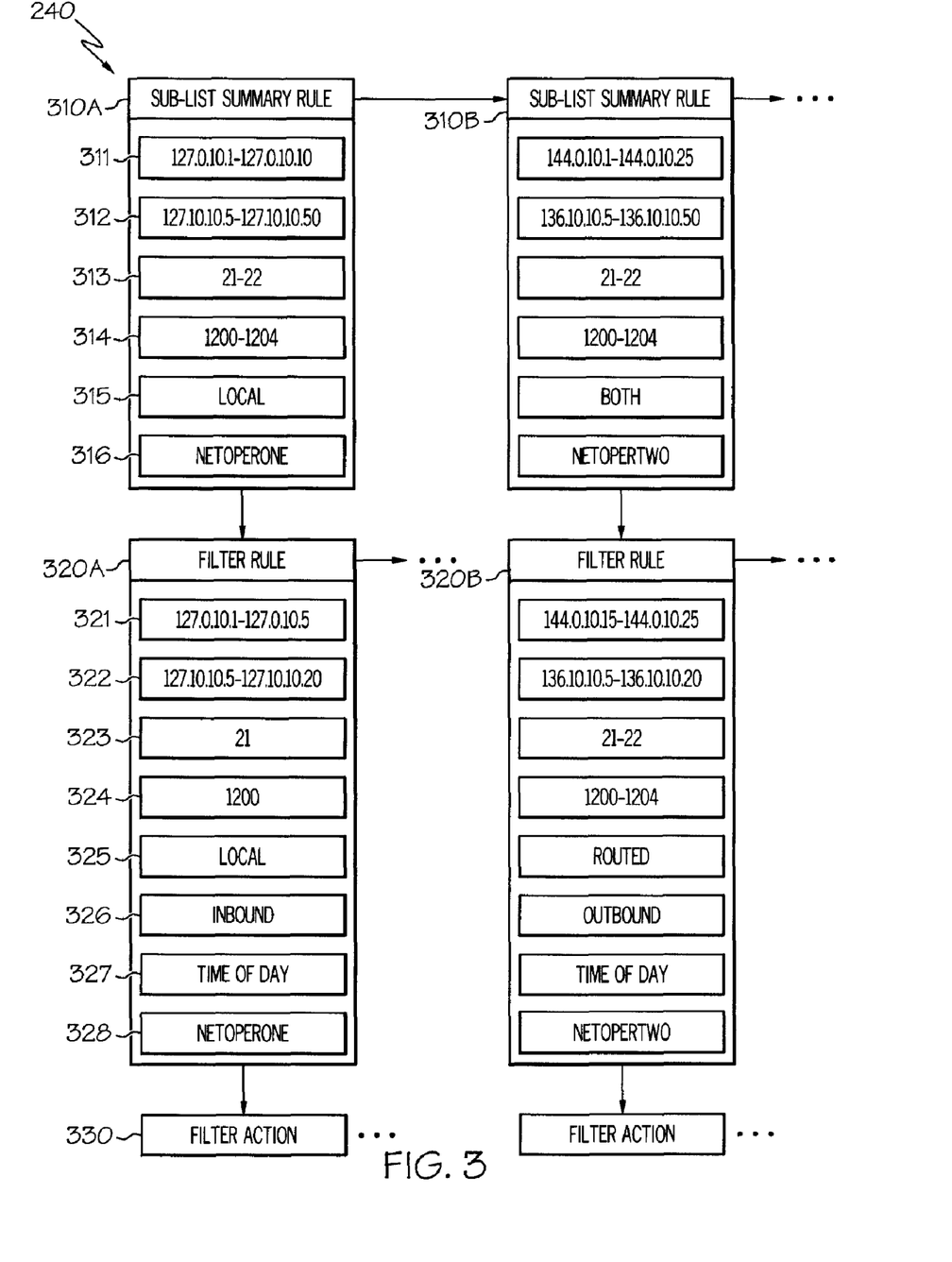
FIG. 3 illustrates an exemplary sub-list summary structure in accordance with the present invention.

FIG. 3 illustrates an exemplary sub-list summary structure 240 in accordance with the present invention. Sub-list summary structure 240 includes sub-list summary rules 310A and 310B. Sub-list summary rule 310A has associated filter rules including filter rule 320A. Sub-list summary rule 310B has associated filter rules including filter rule 320B. Filter rules 320A and 320B are simple form rules. A filter rule such as filter rule 320A is associated with a filter action such as filter action 330 to be performed if an incoming packet meets the conditions of the filter rule. The associated filter rules and sub-list summary rules are illustrated as singly linked lists, a singly linked list of sub-list summary rules and a singly linked list for each group of filter rules associated with a sub-list summary structure. It should be noted that other software container constructs may be implemented within the teaching of the present invention such as a doubly linked list, a FIFO queue, a binary tree, and the like. Although two sub-list summary rules are illustrated, it should be noted that multiple sub-list summary rules will typically exist. The number of sub-list summary rules may not be deterministic and is related to the alternative approaches to step 460 which is described in connection with FIG. 4. It should be noted that sub-list summary structure 240 is stored in memory of a computer such as computer 110.

Sub-list summary rule 310A includes attributes 311-315 which contain values which span the values of all the filter rules associated with sub-list summary rule 310A including filter rule 320A. The term span as used herein means if a condition indicated by an attribute of a filter rule is met then the associated condition indicated by an attribute of the sub-list summary rule is also met. For example, if a range is specified in a filter rule attribute, then the associated range specified in a sub-list summary rule attribute must be at least as large as the range of the filter rule attribute.

Attribute 311 contains a range of source IP addresses. Attribute 312 contains a range of destination IP addresses. Attribute 313 contains a range of source IP ports. Attribute 314 contains a range of destination IP ports. Attribute 315 contains a scope indicator. For example, the scope indicator can be assigned a value designating "local", "routed", or "both." A "local" assignment indicates that rules associated with sub-list summary rule 310A are for packets sourced or destined for the computer running code 111. A "routed" assignment indicates that rules associated with sub-list summary rule 310A are for packets which are being forwarded by the computer running code 111. A "both" assignment indicates that rules associated with sub-list summary 310A are either for packets sourced or destined to the computer running code 111 or for packets being forwarded by the computer.

Each attribute of a sub-list summary attribute contains the narrowest range which encompasses all the ranges or values of the corresponding attribute in the filter rules associated with the sub-list summary rule. In other words, an attribute value in the sub-list summary rule is said to be a union or an aggregate of all the ranges of the attribute values contained in the corresponding filter rules. Sub-list summary rule 310A optionally includes attribute 316 which contains a user configured name such as "NETOPERONE." This user configured name or a like common attribute associates all the simple rules provided by the policy agent which together compose a complex rule. When a packet arrives over input 225, attributes 311-315 are used as qualifying conditions to determine whether a packet should continue comparing its attributes with all the filter rules associated with the sub-list summary rule. If a packet does not qualify under the sub-list summary conditions, the filter packet module 220 determines if the packet qualifies under the next sub-list summary rule thereby advantageously skipping all the filter rules of the first sub-list summary rule. How a sub-list summary structure is searched will be described further in connection with the discussion of FIG. 5.

Filter rule 320A includes attributes 321-327 where attribute 321 contains a range of source IP addresses, attribute 322 contains a range of destination IP addresses, attribute 323 contains a particular source port range of one source port, attribute 324 contains a particular destination port range of one destination port, and attribute 325 contains a value of local. Attribute 326 contains a direction indicator indicating whether filter rule 320A applies to an inbound packet or an outbound packet. The terms "inbound" and "outbound" as used herein are relative to the computer running code 111. Attribute 326 will be discussed further in connection with FIGS. 4 and 5. Attribute 327 contains the time of day or range of time that filter rule 320A should be applied if a packet meets attributes 321-325. An attribute is met when a corresponding attribute in a packet is equal to or inclusively within the range specified in an attribute in the sub-list summary rule or in the filter rule. Filter rule 320A optionally includes attribute 328 which contains a user configured name such as "NETOPERONE."

Referring to FIG. 3, attribute 321 contains a source IP range within attribute 311, attribute 322 contains a destination IP range within attribute 312, and so on. It should be noted that since the range specified in attribute 311 is wider than the range of filter rule attribute 321, other filter rules not illustrated are responsible for widening the range specified in attribute 311.

Figure 4:
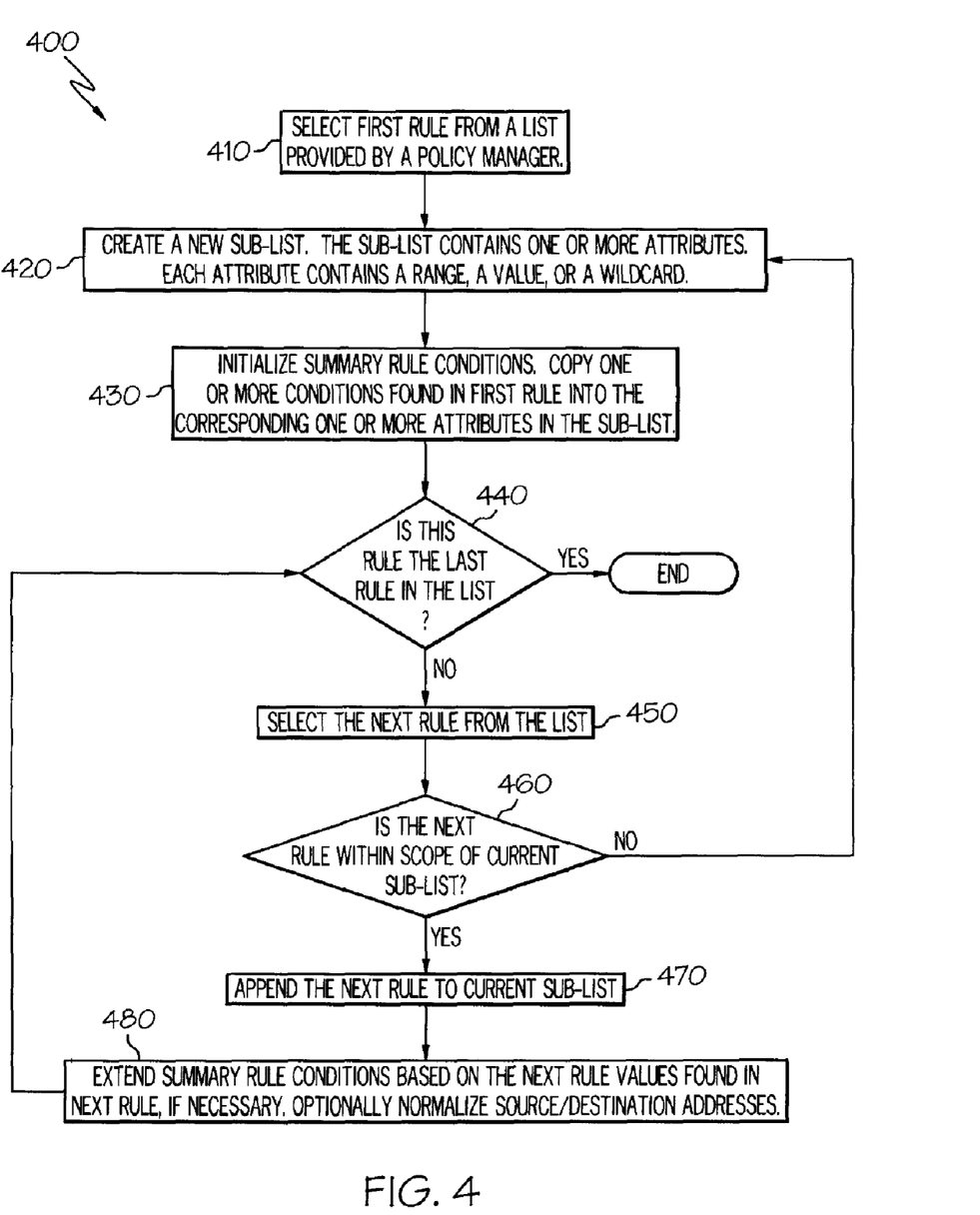
FIG. 4 is a flow chart illustrating a method for assembling the sub-list summary structure of FIG. 3 in accordance with the present invention.

FIG. 4 is a flow chart illustrating a method 400 for assembling a sub-list summary structure, such as structure 240 of FIG. 3, in accordance with the present invention. In the disclosed embodiment, the install filters module 212 contains the computer code to perform the steps of method 400. At step 410, the method selects a first filter rule from a list of filter rules provided, for example, over input 205. At step 420, the method creates a new sub-list summary rule such as sub-list summary rule 310A. The sub-list summary rule contains attributes as shown in FIG. 3. At step 430, the method initializes the sub-list summary rule by copying the attributes in the first filter rule into the corresponding attributes in the sub-list summary rule. Furthermore, the first filter rule becomes associated with the sub-list summary rule such as filter rule 320A being associated with sub-list summary rule 310A.

Optionally, some attributes, also referred to as directional attributes, in the filter rule may be normalized to allow more filter rules to be associated with a particular sub-list summary rule. For example, a source address in one packet may be a destination address in another packet. To associate rules to the same sub-list summary rule, a directional indicator attribute such as attribute 326 is used to indicate whether the rule applies to a packet inbound to the computer running code 111 or to a packet outbound from the computer running code 111. Consequently, if the direction indicator attribute is set to inbound, for example, the source address range and source port range attributes of the filter rule are copied to the destination address range and destination port range attributes of the sub-list summary rule. If the direction indicator attribute is set to outbound, then the source attributes from the filter rule are copied to the source attributes of the sub-list summary rule. Optionally, the method may assign wild card indications to attributes in the sub-list summary rule for corresponding attributes in the filter rule which do not contain values. For example, a filter rule may not have a condition associated with a source address which may occur when the destination address always requires a particular security encoding for packets destined to a node having the destination address.

At step 440, it is determined if the filter rule currently being processed is the last filter rule from the list of filter rules provided over input 205. If it is, the method ends. Otherwise, the method proceeds to step 450 where the next filter rule from the list is selected to be processed. At step 460, it is determined whether the next filter rule is within the scope of the current sub-list summary rule.

There are numerous alternative approaches to finding out whether the next filter rule is within the scope of the current sub-list summary rule. A first alternative includes utilizing attributes of the filter rules which are provided over input 205. As mentioned above, the install filter module 212 essentially recombines the simple rules into a complex rule when assembling a sub-list summary structure by correlating a common attribute associated with the simple rules. For example, a set of simple rules received over input 205 may all have the same user configured name associated with each simple rule. Determining scope of the current sub-list summary rule using the first alternative involves comparing the user configured name in the current sub-list summary rule with the user configured name in the next filter rule. If the user configured names are equal, then the current filter rule will be considered within the scope of the sub-list summary rule and the method would proceed to step 470. In this first alternative, a sub-list summary rule will be associated with all the simple rules which together compose a complex rule from which the simple rules were derived. Furthermore, there will be a sub-list summary rule for each configured complex rule.

A second alternative includes using known spanning metrics to calculate a distance between the current filter rule and the current sub-list summary rule. If the calculated distance is within a predefined threshold, then the current filter rule would be considered within the scope of the sub-list summary rule and the method would proceed to step 470.

A third alternative includes substantially equal distribution of a number of filter rules across each sub-list summary rule. Determining scope using this alternative involves determining whether the current sub-list summary rule has exceeded its predefined number of filter rules. If it is determined that it does not, the current filter rule would be considered within the scope of the sub-list summary rule and the method would proceed to step 470

A fourth alternative includes using probabilistic methods to maximize the number of filter rules that are skipped for the average packet. Rather than creating the sub-list structure in a particular order as method 400 describes, the fourth alternative initially constructs the sub-list structure in no particular order. The fourth alternative requires that the sub-list summary structure be re-evaluated on a scheduled basis to determine which filter rules are matching the least number of packets so that the least matched filter rules would be grouped together into one sub-list summary rule. Furthermore, this fourth alternative would statistically group filter rules into sub-list summary rules. For example, one sub-list summary rule may contain a single filter rule that matches 50 percent of the packets, while another sub-list summary rule may contain a large number of consecutive filter rules that individually match only 1-2 percent of the packets.

Returning to step 460, if the next filter rule is not within the scope of the sub-list summary rule, the method proceeds to step 420 to create a new sub-list summary rule. Otherwise, the method proceeds to step 470. At step 470, the next filter rule is appended to the sub-list summary rule.

At step 480, the sub-list summary rule attributes are extended based on the filter rule values found in next rule, if necessary. If all the attributes of the filter rule are lesser included ranges of each attribute in the sub-list summary rule, the sub-list summary rule attributes will not be extended. Sub-list summary rule attributes which are lesser included ranges of the filter rule attributes are extended. For example, if the source address attribute of the sub-list summary rule is 127.0.10.25-127.0.10.50 and the source address attribute of the filter rule is 127.0.10.30-127.0.10.60, the source address attribute of the sub-list summary rule will be extended to 127.0.10.25-127.0.10.60. Extensions to attribute ranges can be performed in both directions. If, for example, an attribute of the filter rule specifies a list of values rather than a range, step 480 constructs the narrowest range in the corresponding attribute of the sub-list summary rule that covers all possible values of the attribute of the filter rule. For example, the source port range of the filter rule may include ports 20, 21, and 80 and the source port range of the sub-list summary rule is 15-25, then step 480 extends the source port range of the sub-list summary rule to be 15-80.

Step 480 may optionally normalize source and destination addresses and ports. If the direction attribute, such as attribute 326, in the filter rule indicates "inbound", for example, the source address and port ranges of the filter rule are used to extend the destination address and port ranges in the sub-list summary rule, if necessary, and the destination address and port ranges of the filter rule are used to extend the source address and port ranges in the sub-list summary rule, if necessary. Step 480 proceeds to step 440 to determine the currently processed filter rule is the last rule in the list of filter rules. At the completion of method 400, a sub-list summary structure such as sub-list summary structure 240 is assembled to contain multiple sub-list summary rules where each sub-list summary rule includes a number of expanded attributes and one or more filter rules. When a packet arrives over input 225 to the filter packet module 220, the filter packet module 220 compares the packet attributes with sub-list summary rule attributes. The filter packet module 220 skips the comparison of all the associated filter rules if the packet attributes do not compare with the sub-list summary rule attributes.

Figure 5:
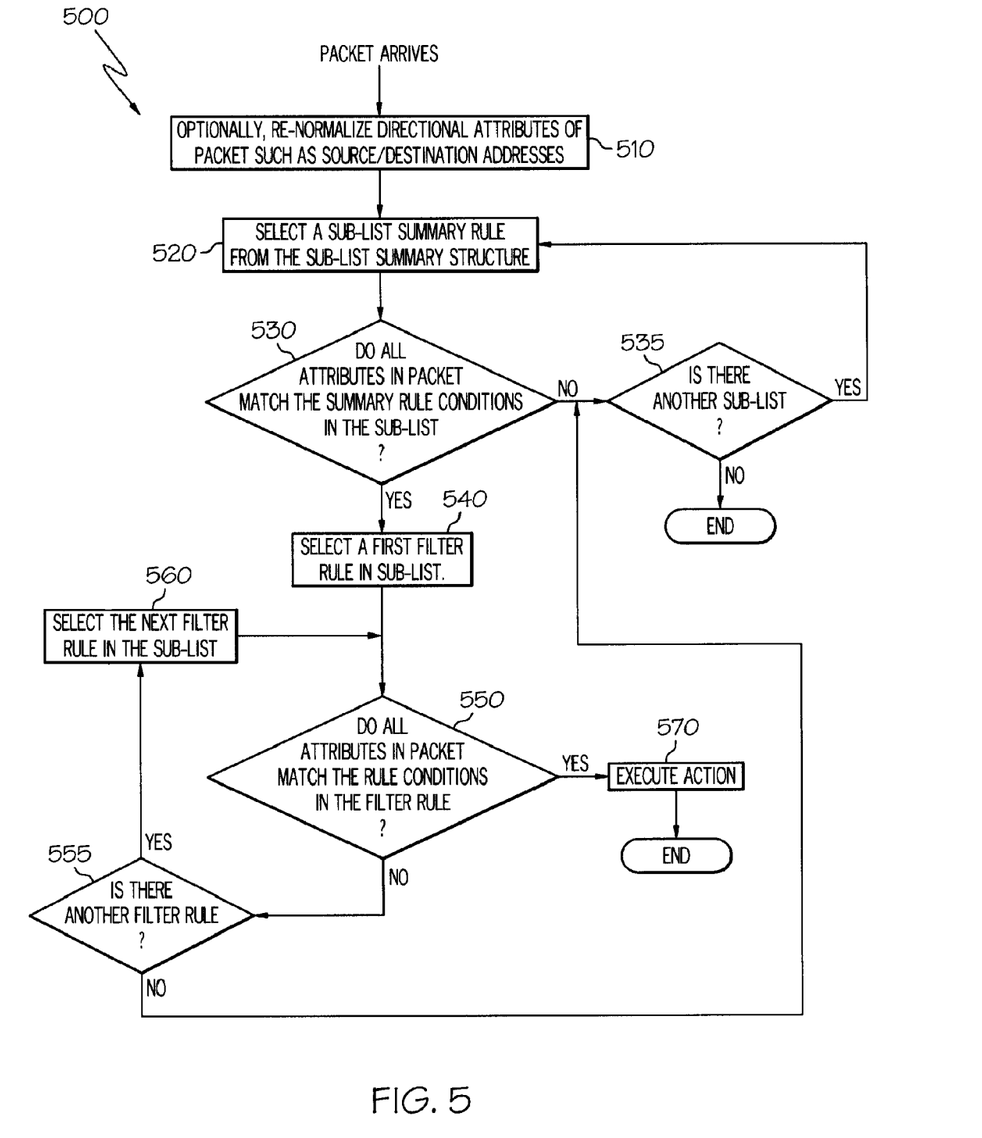
FIG. 5 is a flow chart illustrating a method of searching the sub-list summary structure of FIG. 3 in accordance with the present invention.

FIG. 5 is a flow chart illustrating a method 500 of searching the sub-list summary structure of FIG. 3 in accordance with the present invention. Method 500 begins with a packet being received, for example, over input 225 to the filter packet module 220. At optional step 510, an indicator is provided with the packet over input 225 to indicate whether the packet is inbound or outbound. If the packet is inbound, the source address and source port found in the packet are compared with the destination address and destination port, respectively, in a sub-list summary rule. At step 520, a sub-list summary rule is selected from a summary structure such as summary structure 240. At step 530, the method 500 determines if all attributes in the packet such as source address, destination address, and the like are inclusively within the range of attributes in the sub-list summary rule. If not, method 500 proceeds to step 535 which determines whether there are any more sub-list summary rules. If there are not, method 500 ends. If there is another sub-list summary rule, method 500 proceeds to step 520 to select the next sub-list summary rule.

Returning to step 530, if the packet's attributes are within the range of attributes in the sub-list summary rule, method 500 iterates over the filter rules associated with the sub-list summary rule. This iteration includes steps 540, 550, 555, and 560. At step 540, a first filter rule is selected from the sub-list summary rule. At step 550, it is determined if all the attributes in the packet are within the range or match the values in the attributes of the selected filter rule. If the attributes of the packet meet the conditions of the selected filter rule, method 500 proceeds to step 570 to execute the action associated with the filter rule. Depending on the type of action performed, the output of the action may be sent over output 235. Method 500 then ends.

Returning to step 550, if the attributes of the packet do not meet the conditions of the selected filter rule, method 500 proceeds to step 555. At step 555, it is determined if there is another filter rule associated with the current sub-list summary rule. If there is not, method 500 proceeds to step 535 to retrieve the next sub-list summary rule. If there is another filter rule associated with the current sub-list summary rule, method 500 proceeds to step 560. At step 560, method 500 selects the next filter rule in the sub-list summary rule. Method 500 then proceeds to step 550.

In the disclosed embodiment, the filter packet module 212 contains the computer code to perform the steps of method 500 except step 570. The perform action module 230 contains the computer code to perform step 570.

While the present invention has been disclosed in the context of various aspects of presently preferred embodiments, it will be recognized that the invention may be suitably applied to other environments consistent with the claims which follow. Such environments include electronic mail applications, user profile driven applications such as server administration applications, and the like.

What is claimed is:

1. A computer-implemented method for filtering data packets in a network comprising,
    collecting configured filter rules containing logical expressions for processing data packets,
    determining simple form filter rules based on the configured filter rules, wherein the simple form filter rules comprises a filter group name and attributes to correlate the simple form rules to a complex form filter rule,
    assembling a sub-list summary structure, wherein the sub-list summary structure comprises simple form filter rules recombined into complex form filter rules by common attribute data and wherein the sub-list summary structure further includes sub-list summary rules each containing a plurality of filter rules and sub-list summary attributes containing the narrowest ranges which encompass all of the ranges or values of the corresponding attributes in the filter rules associated with the sub-list summary rule,
    receiving a packet with attributes,
    determining applicable filter rule by comparing the attributes of the received packet with the attributes of the sub-list summary structure.

2. The computer-implemented method of claim 1 wherein the configured filter rules are ordered from most specific rule to least specific rule.

3. The computer-implemented method of claim 1 wherein the attribute is a packets address.

4. The computer-implemented method of claim 1 wherein the attribute is a user configured name.

5. The computer-implemented method of claim 1 wherein the step of determining applicable filter rule includes:
    determining whether attributes of the received packet meet the corresponding summary attributes of a first one of the sub-list summary rules; and
    determining whether attributes of the received packet meet the summary attributes of a second one of the sub-list summary rules, if the attributes of the received packet do not meet the summary attributes of the first one of the sub-list summary rules.

6. The computer-implemented method of claim 1 wherein the filter rules are distributed substantially equally across the sub-list summary rules.

7. A computer system for filtering data packets in a network comprising a processor configured to perform:
    collecting configured filter rules containing logical expressions for processing data packets,
    determining simple form filter rules based on the configured filter rules, wherein the simple form filter rules comprises a filter group name and attributes to correlate the simple form rules to a complex form filter rule,
    assembling a sub-list summary structure, wherein the sub-list summary structure comprises simple form filter rules recombined into complex form filter rules by common attribute data and wherein the sub-list summary structure further includes sub-list summary rules each containing a plurality of filter rules and sub-list summary attributes containing the narrowest ranges which encompass all of the ranges or values of the corresponding attributes in the filter rules associated with the sub-list summary rule, receiving a packet with attributes, determining applicable filter rule by comparing the attributes of the received packet with the attributes of the sub-list summary structure.

8. The computer system of claim 7 wherein the configured filter rules are ordered from most specific rule to least specific rule.

9. The computer system of claim 7 wherein the attribute is a packets address.

10. The computer system of claim 7 wherein the attribute is a user configured name.

11. The computer system of claim 7 wherein the processor is further configured to perform:
   determining whether attributes of the received packet meet the corresponding summary attributes of a first one of the sub-list summary rules; and
   determining whether attributes of the received packet meet the summary attributes of a second one of the sub-list summary rules, if the attributes of the received packet do not meet the summary attributes of the first one of the sub-list summary rules.

12. The computer system of claim 7 wherein the filter rules are distributed substantially equally across the sub-list summary rules.

13. A computer program product comprising a computer usable storage medium having stored therein computer usable program code for filtering data packets in a network, wherein the medium is not a transient signal, the computer usable program code, when executed by a computer, causing the computer to perform the steps of: collecting configured filter rules containing logical expressions for processing data packets, determining simple form filter rules based on the configured filter rules, wherein the simple form filter rules comprises a filter group name and attributes to correlate the simple form rules to a complex form filter rule, assembling a sub-list summary structure, wherein the sub-list summary structure comprises simple form filter rules recombined into complex form filter rules by common attribute data and wherein the sub-list summary structure further includes sub-list summary rules each containing a plurality of filter rules and sub-list summary attributes containing the narrowest ranges which encompass all of the ranges or values of the corresponding attributes in the filter rules associated with the sub-list summary rule, receiving a packet with attributes, determining applicable filter rule by comparing the attributes of the received packet with the attributes of the sub-list summary structure.

14. The computer program product of claim 13 wherein the configured filter rules are ordered from most specific rule to least specific rule.

15. The computer program product of claim 13 wherein the attribute is a packets address.

16. The computer program product of claim 13 wherein the attribute is a user configured name.

17. The computer program product of claim 13 wherein the step of determining applicable filter rule includes:
   determining whether attributes of the received packet meet the corresponding summary attributes of a first one of the sub-list summary rules; and
   determining whether attributes of the received packet meet the summary attributes of a second one of the sub-list summary rules, if the attributes of the received packet do not meet the summary attributes of the first one of the sub-list summary rules.

18. The computer program product of claim 13 wherein the filter rules are distributed substantially equally across the sub-list summary rules.

* * * * *